US005932016A

United States Patent [19]
Paananen et al.

[11] Patent Number: 5,932,016
[45] Date of Patent: Aug. 3, 1999

[54] PROCESS FOR DECOLORIZATION OF SOLUTIONS

[75] Inventors: Hannu A. Paananen, Kantvik, Finland; Tong Wen, Newcastle-upon-Tyne, United Kingdom

[73] Assignee: Cultor Oy, Finland

[21] Appl. No.: 08/836,581

[22] PCT Filed: Nov. 14, 1994

[86] PCT No.: PCT/FI95/00629

§ 371 Date: Jul. 17, 1997

§ 102(e) Date: Jul. 17, 1997

[87] PCT Pub. No.: WO96/15274

PCT Pub. Date: May 23, 1996

[30] Foreign Application Priority Data

Nov. 15, 1994 [FI] Finland .................................... 945376

[51] Int. Cl.$^{6}$ .............................. C13D 3/02; B01D 21/01
[52] U.S. Cl. ................................ 127/48; 127/50; 210/702
[58] Field of Search ......................... 127/48, 50; 210/702

[56] References Cited

U.S. PATENT DOCUMENTS 2,015,375 9/1935 Bumonti .
4,492,601 1/1985 Nakasone et al. .
5,110,363 5/1992 Clarke et al. .......................... 127/46.1

OTHER PUBLICATIONS

CA 125:89521 Paananen et al "A process for delcorization . . ." Nov. 15, 1994.

CA 126:198707 Martoyo et al. "Poly–aluminum chloride (PAC) as a clarifying reagent . . ." 1996.

*Primary Examiner*—David Brunsman
*Attorney, Agent, or Firm*—Nixon & Vanderhye

[57] ABSTRACT

The invention relates to a process for decolorization of solutions of sugars, sugar alcohols and betaine. In accordance with the process, a polyaluminium chloride is added to a solution of sugar, sugar alcohol or betaine having a dry substance content of 10 to 70% by weight and a temperature of 60 to 105° C. in a suitable amount so as to obtain a mixture having a pH of 5.5 to 9.5, thereby precipitating the coloured substances, and the formed precipitate is separated from the solution. The invention also relates to the use of a polyaluminium chloride for decolorization of solutions of sugars, sugar alcohols and betaine.

10 Claims, No Drawings

PROCESS FOR DECOLORIZATION OF SOLUTIONS

BACKGROUND OF THE INVENTION

The present invention relates to a process for decolorization of aqueous solutions of sugars, sugar alcohols and betaine and to the use of polyaluminium chlorides for this purpose.

In this connection, polyaluminium chloride refers to compounds of the general formula $$[Al_2(OH)_xCl_{6-x}]_y \quad \text{(I)}$$

wherein $1 \leqq x \leqq 5$ and $1 \leqq y \leqq 10$; and to mixtures of these compounds and corresponding compounds and to mixtures of compounds containing sulphate ions in addition to hydroxyl and chloride ions.

The compounds of the above formula I include, for instance, compounds of the formula $$Al_n(OH)_mCl_{3n-m} \quad \text{(II)}$$

which in the case that n=2 has the form $$Al_2(OH)_mCl_{6-m} \quad \text{(III).}$$

In the case that there are also sulphate ions in the product, the compounds can be represented by the general formula $$[Al_2(OH)_nCl_{6-n}]_m(SO_4)_1 \quad \text{(VI).}$$

Such products, generally known as polyaluminium chlorides, are commercially available; sometimes they are also termed basic aluminium chlorides. They are referred to with the abbreviation PAC, or also with the abbreviation PACS if the product also contains sulphate ions.

A process for preparing compounds included in these products is disclosed in U.S. Pat. No. 3,891,745, in which the products obtained are named basic aluminium chlorides and have the general formula $Al_2(OH)_{6-n}Cl_n$, wherein n is a number between 1 and 5.

Polyaluminium chlorides have been used in water purification for coagulation (precipitation) of impurities in waste water. As far as the applicants are aware, however, they have not been used in the decolorization of sugar solutions.

The processes for manufacture of sugar utilized in the sugar industry comprise numerous purification steps of the sugar-containing solution, in which steps the impurities contained in the raw material of sugar are removed in order to obtain pure sucrose. From the crude sugar juice obtained from compression of sugarcane or from the sugar juice obtained from leaching of sugarbeets, pure sugar is manufactured by processes comprising various purification, evaporation and crystallization steps. Part of the coloured impurities is entrapped in the precipitate formed by treatment with lime [$Ca(OH)_2$] and carbon dioxide; part thereof, however, remains in the solution. In the beet sugar industry, this coloured solution is crystallized and recrystallized (the colured crystals are dissolved and crystallized again), whereby pure white sugar and molasses are finally obtained by means of this recycling, the coloured substances being concentrated in the molasses. In sugar refineries, this solution is decolorized, for instance, by treatment with bone char or activated carbon, and/or by a decolorizing ion exchange, and from the slightly coloured solution thus obtained white sugar can be crystallized with less recrystallization (less recycling). Again, part of the colour is concentrated in the final mother liquid of the crystallization, i.e. in the molasses. Molasses, on the other hand, may be fractionated chromatographically into a sugar fraction and a non-sugar fraction. The sugar fraction produced by this process is also coloured, and the above procedures are again necessary when pure sugar is produced from it.

The solutions of sugar alcohols also often contain such coloured impurities of plant origin or derived from the sugar process, since they are typically produced by the reduction of sugars in the form of a solution. Furthermore, when betaine is produced for example by fractionating molasses, the betaine fraction may contain such coloured substances.

U.S. Pat. No. 4,382,823 and the references cited therein disclose several processes for purification of sugar solutions. Some of them utilize aluminium sulphate in combination with lime, whereby a floc is obtained. This is separated, after a optional addition of a polyelectrolyte, by allowing it to settle over a longer period of time or by flotation, i.e. by aerating the mixture and removing the floc floated in the form of a scum onto the surface of the mixture. Such a flotation process is also the object of U.S. Pat. No. 4,382,823; in this process a floc is formed by means of a combination of lime and either a phosphate ion source or aluminium sulphate, a small part of the mixture to be treated is strongly aerated and combined with the remaining part of the mixture, whereafter polyacrylamide electrolyte solution is added and the resulting floc is allowed to float onto the surface as a scum, which is separated from the clarified sugar solution. Part of the sugar contained in the starting solution is entrapped in the floc and thereby in the scum, from which it can be recovered by dissolving it in water and re-purifying the sugar solution thus obtained by the process described.

DESCRIPTION OF THE INVENTION

It has now been discovered that the coloured substances that are present in solutions of sugars, sugar alcohols and betaine, which are partly of plant origin and partly formed during the sugar process, can be quickly precipitated by means of polyaluminium chloride, and the formed precipitate can be separated and washed, so that sugar loss into the precipitate is not significant.

Thus, an object of the invention is the use of polyaluminium chlorides for decolorization of solutions of sugars, sugar alcohols and betaine. Any compound of the above formula I or a mixture of such compounds or corresponding compounds containing sulphate ions in addition to hydroxyl and chloride ions can be used for this purpose.

Another object of the invention is a process for decolorization of solutions of sugars, sugar alcohols and betaine. In this process, a polyaluminium chloride is added to the solution having a dry substance content of 10–70% by weight and a temperature of 60–105° C. in a suitable amount to precipitate the coloured substances. The pH of the resulting mixture should be within the range of 5.5–11.5. A pH range of 6.0–9.0 is preferable.

The suitable amount of polyaluminium chloride to be used for the precipitation of the coloured substances can be easily determined by a person skilled in the art, for instance by means of preliminary tests.

The polyaluminium chlorides are preferably used in the form of aqueous solutions, in which form they are also usually commercially available. They have a pH within the acid range in water solutions despite the fact that they are sometimes referred to with the above term "basic aluminium chloride". Precipitation between PAC and coloured substances occurs best within the pH range mentioned above. Thus, the pH of the solution to be treated should be adjusted, if necessary, in such a manner that the pH is within this range after the PAC addition; otherwise precipitate is not formed or is formed only in a minor amount.

With respect to temperature, a range of 80–90° C. is advantageous in the case of a dilute solution (with a dry substance content of 10–50% by weight), and a range of 80–100° C. is advantageous in the case of a concentrated solution (with a dry substance content of 50–70% by weight).

The dry substance content is preferably within the range 10–35% in the case of thin juices or a product solution from chromatographic separation, and within the range 55–70% in the case of thick juices.

The precipitate of aluminium salts obtained in this process entraps the colour present in the initial solution. The precipitate can be separated from the solution by filtration, for instance. Other methods for separating the precipitate are settling, centrifugation and flotation.

The process of the invention is suitable for all sugar-containing, sugaralcohol-containing and betaine-containing solutions that contain colour sources of plant origin and/or formed during the process. These can be derived, for instance, from sugarcane, sugarbeet, corn, wheat, barley (for example in the process of manufacturing starch sugar) or wood (for example in the preparation of xylose from wood hydrolysates). A preferred embodiment of the invention is the decolorization of sugar solutions formed in various steps of sugar manufacture, whereby the dry substance contents of said solutions may range from 10–20% by weight for thin juices to 60–70% by weight for thick juices.

The invention is illustrated in more detail by the following examples, which are not intended to limit the scope of the invention.

The colours of the solutions were measured by ICUMSA Method 4 described in *Sugar Analysis; Official and Tentative Methods Recommended by the International Commission for Uniform Methods of Sugar Analysis* (*ICUMSA*), Schneider, F. (Ed.), ICUMSA, Peterborough, England, 1979, pp. 125–128.

EXAMPLE 1

The sugar solution to be purified was a product solution obtained from chromatographic separation of beet molasses.

9.0 l of the sugar solution was heated to a temperature of 85° C., whereafter 180 ml of a commercial PAC product KEMPAC 10™ (manufacturer Kemira Oy) having a pH of 2.6±0.3 and containing a polyaluminium chloride $Al_n(OH)_mCl_{3n-m}$ in water solution in an amount corresponding to a concentration of 10.3±0.3% calculated as $Al_2O_3$ was added. After the PAC addition, the mixture had a pH of 7.52. The mixture was filtered with Macherey-Nagel filter paper MN85/90, whereby 8.1 l of a clear solution was obtained, which had a colour of about 13800 ICUMSA, 420 nm.

The analysis results for the sugar solution before and after the PAC treatment are shown in Table 1 below.

TABLE 1

| | Before PAC treatment | After PAC treatment |
|---|---|---|
| dry substance content, % by weight | 29.5 | 29.0 |
| Sucrose, % by weight of dry substance | 74.97 | 74.84 |
| Amino acids, % by weight of dry substance | 1.43 | 1.24 |
| Na, mg/kg | 1140 | 1100 |
| K, mg/kg | 3430 | 2838 |
| Ca, mg/kg | 11 | 51 |
| Al, mg/kg | <0,2 | <0,2 |
| Colour, ICUMSA, 420 nm | 27450 | 13817 |
| pH | 10.12 | 7.52 |

As can be seen from the change of colour, substantial decolorization of the treated solution was obtained by the process of the invention.

EXAMPLE 2

This test was carried out in order to evaluate the sugar loss in the precipitation and filtration process.

The sugar solution to be purified was a product solution obtained from chromatographic separation of beet molasses.

9.0 l of the sugar solution with 29% dry substance content, containing 2828 g of dry substance with a colour of 29670 ICUMSA, 420 nm, was heated to a temperature of 85° C., whereafter 180 ml of a commercial PAC product KEMPAC 10™ (manufacturer Kemira Oy) was added. The mixture was filtered, whereby about 8.1 l of a clean sugar solution was obtained, which had a colour of 12648 ICUMSA, 420 nm.

The filtration cake was then weighed and RDS (refractometric dry substance) determined so that the amount of refractometric dry substance in it could be calculated. The cake was mixed with washing water (300% w/w) and the mixture was filtered, whereby a sweet washing water and a second filtration cake were obtained. The second cake was mixed again with the same quantity of washing water, the mixture was filtered and thus a second sweet washing water and the final filtration cake were obtained. The latter was weighed and its RDS determined in order to calculate the amount of refractometric dry substance in it. The two sweet washing waters were mixed and the colour of the mixture was determined.

The results are shown in Table 2 below.

TABLE 2

| | RDS amount (g) | RDS percentage (%) | Colour (ICUMSA 420 nm) |
|---|---|---|---|
| Starting sugar solution | 2828 | 100 | 29670 |
| PAC treated sugar solution | — | — | 12648 |
| Sweet washing water | — | — | 10014 |
| First filtration cake | 426.7 | 15.1 | — |
| Final filtration cake | 6.5 | 0.23 | — |

The results shown in Table 2 show that sugar loss into the filtration cake is not significant if the filtration cake is washed. The sweet washing water thus obtained can be used in the preparation of a molasses solution for use in chromatographic separation, or other dilution processes in sugar manufacture. The colour of this sweet washing water is slightly lower compared with that of the PAC-treated sugar solution. Since the ICUMSA value is based on the dry substance content which is low (about 4.5%) in the sweet washing water, re-use of this sweet washing water will not have a significant negative effect on the total colour level of the final product.

EXAMPLE 3

Raw Beet Juice After Preliming

The raw beet juice sample used was picked up after the preliming but before carbonation. A PAC product, KEMPAC 10™ (manufacturer Kemira Oy), was tested. 150 ml of raw beet juice was heated to 80° C., mixed with a designed volume of PAC, the mixture was then filtrated, and the colour of the clear juice obtained was analyzed. Table 3 shows a typical juice colour change with different PAC dosages. The colour dropped from ICUMSA 3163 to 732 (−76.9%) with a KEMPAC 10™ dosage of 1.25% (v/v).

TABLE 3

PAC Decolorization of raw beet juice

| Sample | RI (w/w) | PAC (v/v) | pH | Colour (ICUMSA) | Decolorization |
|---|---|---|---|---|---|
| A | 16.6% | 0.00% | 11.66 | 3163 | |
| B | 15.5% | 0.42% | 11.50 | 2245 | −29.0% |
| C | 15.5% | 0.83% | 11.16 | 1535 | −51.5% |
| D | 15.5% | 1.25% | 10.63 | 732 | −76.9% |
| E | 15.5% | 1.67% | 10.11 | 819 | −74.1% |
| F | 15.4% | 2.08% | 9.42 | 748 | −76.4% |
| G | 15.4% | 2.50% | 9.07 | 1390 | −56.1% |

To make a comparison between the traditional double carbonation process and the invented PAC decolorization process, the average colour of thin beet juice after the first and second carbonation was about 1100–1300 (ICUMSA).

EXAMPLE 4

Thin Beet Juice After 1st and 2nd Carbonation

The thin beet juice sample used was picked up after the 1st and 2nd carbonation but before the evaporation. A PAC product, KEMPAC 10™ (manufacturer Kemira Oy), was tested. 300 ml of the thin beet juice was heated to 80° C., mixed with a designed volume of PAC, the mixture was then filtrated, and the colour of the clear juice obtained was analyzed. Table 4 shows a typical juice colour change with different PAC dosages. The colour dropped from ICUMSA 1145 to 761 (−33.5%) with a KEMPAC 10™ dosage of 0.42% (v/v).

TABLE 4

PAC Decolorization of thin beet juice

| Sample | RI (w/w) | PAC (v/v) | pH | Colour | Decolorization (ICUMSA) |
|---|---|---|---|---|---|
| A | 16.6% | 0.00% | 9.15 | 1145 | |
| B | 16.9% | 0.21% | 8.51 | 1006 | −12.1% |
| C | 16.8% | 0.31% | 7.82 | 911 | −20.4% |
| D | 16.3% | 0.42% | 6.94 | 761 | −33.5% |

EXAMPLE 5

Betaine Solution

The betaine solution sample had a concentration of about 60 ° Brix, which was diluted first to about 15 ° Brix by mixing it with 300% (v/v) water, and then heated to about 85° C. for the PAC decolorization tests. A PAC product, KEMPAC 10™ (manufacturer Kemira Oy), was tested. 200 ml of the betaine solution was heated to 85° C., mixed with a designed volume of PAC, the mixture was then filtrated, and the colour of the clear solution obtained was analyzed. Table 5 shows the results.

The betaine concentration of samples A to D was about 16 ° Brix, with the KEMPAC 10™ dosage from 0.3% to 0.5% (v/v), the colour dropped respectively from −37.1% to −57.5%, while the pH dropped from about 10.7 to 6.4.

TABLE 5

PAC Decolorization of betaine solution

| Sample | RI (w/w) | PAC (v/v) | pH | Colour | Decolorization (ICUMSA) |
|---|---|---|---|---|---|
| A | 17.1% | 0.0% | 10.7 | 6995 | |
| B | 16.0% | 0.3% | 9.5 | 4399 | −37.1% |
| C | 16.2% | 0.4% | 7.2 | 3330 | −52.4% |
| D | 16.4% | 0.5% | 6.4 | 2973 | −57.5% |

EXAMPLE 6

Inositol Solution

The inositol solution was obtained from a chromatographic separation process and had an original pH of 7.8. A PAC product, KEMPAC 10™ (manufacturer Kemira oy), was tested. The pH was increased from 7.8 to 9.2 by adding NaOH, and the solution was heated to 85° C., then KEMPAC 10™ was added from 0.08% to 0.56% (v/v), Table 6 shows the results. About 53% decolorization could be achieved with a chemical dosage of about 0.24% (v/v), while the pH dropped from 9.2 to 7.4.

TABLE 6

PAC Decolorization of betaine solution

| Sample | RI (w/w) | PAC (v/v) | pH | Colour | Decolorization (ICUMSA) |
|---|---|---|---|---|---|
| A | 24.4% | 0.0% | 7.8 | 11123 | |
| B* | 25.7% | 0.0% | 9.2 | 11232 | +1.0% |
| C | 25.4% | 0.08% | 8.6 | 10494 | −5.7% |
| D | 23.8% | 0.16% | 8.0 | 7520 | −32.4% |
| E | 23.6% | 0.24% | 7.4 | 5224 | −53.0% |
| F | 25.0% | 0.32% | 6.3 | 5116 | −54.0% |

*NaOH was added to increase the pH.

We claim:

1. A process for decolorization of solutions of sugars, sugar alcohols and betaine, comprising the steps of:

(a) adding a polyaluminum chloride of the formula (I)

$$[Al_2(OH)_xCl_{6-x+}]_y$$

wherein 1≦x≦5 and 1≦y≦10, or a mixture of such compounds or a corresponding compound or mixture of compounds further containing sulfate ions, to the solution of sugar, sugar alcohol or betaine having a dry substance content of 10–70% by weight and a temperature of 60–105° C. in an amount to obtain a mixture having a pH of 5.5 to 11.5, thereby precipitating colored substances, and thereafter (b) separating the formed precipitate from the solution.

2. The process according to claim 1 wherein the pH of the mixture obtained after addition of polyaluminum chloride is 6.0 to 9.0.

3. The process according to claim 1 wherein the temperature is 80–90° C.

4. The process according to claim 1 wherein the temperature is 80–100° C.

5. The process according to claim 1 wherein the sugar, sugar alcohol or betaine solution has a dry substance content of 10 to 35% by weight.

6. The process according to claim 1 wherein the sugar, sugar alcohol or betaine solution has a dry substance content of 55 to 70% by weight.

7. The process according to claim 1 wherein the polyaluminum chloride is added in the form of an aqueous solution.

8. The process according to claim 1 wherein the precipitate is separated by filtration.

9. The process according to claim 1 wherein sucrose is the major sugar component in the solution to be treated.

10. A process for removing colored substances present in sucrose solutions also optionally containing other sugars, sugar alcohols and betaine, said sugars comprising the steps of:

(a) adding to said sucrose solution a polyaluminum chloride of the formula (I)

$$[Al_2(OH)_xCl_{6-x+}]_y$$

wherein $1 \leqq x \leqq 5$ and $1 \leqq y \leqq 10$, or a mixture of such compounds or a corresponding compound or mixture of compounds further containing sulfate ions, said solution having a dry substance content of 10–70% by weight and a temperature of 60–105° C., the polyaluminum chloride added in the amount to obtain a mixture having a pH of 6.0 to 9.0, thereby precipitating the colored substances, and thereafter (b) removing the formed precipitate from the treated solution.

* * * * *

UNITED STATES PATENT AND TRADEMARK OFFICE

CERTIFICATE OF CORRECTION

PATENT NO. : 5,932,016
DATED : August 3, 1999
INVENTOR(S) : PAANANEN et al

It is certified that error appears in the above-identified patent and that said Letters Patent is hereby corrected as shown below:

On the title page, column 1, item [22] should read --November 14, 1995--.

Signed and Sealed this
First Day of February, 2000

Attest:

Q. TODD DICKINSON

*Attesting Officer*

*Acting Commissioner of Patents and Trademarks*